United States Patent
Jalaldeen et al.

(10) Patent No.: US 9,994,289 B2
(45) Date of Patent: Jun. 12, 2018

(54) AUTOMATED COMMERCIAL FISHING LOCATION DETERMINATION

(71) Applicant: INTERNATIONAL BUSINESS MACHINES CORPORATION, Armonk, NY (US)

(72) Inventors: Ahamed Jalaldeen, Bangalore (IN); Chivukula V. Narayana, Rogers, AR (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/795,318

(22) Filed: Oct. 27, 2017

(65) Prior Publication Data
US 2018/0057121 A1 Mar. 1, 2018

Related U.S. Application Data

(63) Continuation of application No. 15/060,961, filed on Mar. 4, 2016, now Pat. No. 9,896,166.

(51) Int. Cl.
*B60L 3/00* (2006.01)
*B63B 35/14* (2006.01)
*G05D 1/02* (2006.01)

(52) U.S. Cl.
CPC ........... *B63B 35/14* (2013.01); *G05D 1/0206* (2013.01)

(58) Field of Classification Search
CPC .............................. B63B 35/14; G05D 1/0206
See application file for complete search history.

(56) References Cited

U.S. PATENT DOCUMENTS 6,763,195 B1 * 7/2004 Willebrand ........ H04B 10/1123
398/115
6,950,810 B2 * 9/2005 Lapsley ................ G01F 19/005
235/380

(Continued)

FOREIGN PATENT DOCUMENTS

WO  2008066879  6/2008
WO  2012096684  7/2012

OTHER PUBLICATIONS

Alec; 3D Printed Waterproof AguaDrone with Sonar Fish Finder Launches on Kickstarter; Jun. 3, 2015; URL: http://www.3ders.org/articles/201506030-3d-printed-waterproof-aguadrone-with-sonar-fish-finder-launches-on-kickstarter.html; Retrieved from the Internet on Aug. 12, 2015; 12 pages.

(Continued)

*Primary Examiner* — Adam M Alharbi
(74) *Attorney, Agent, or Firm* — Schmeiser, Olsen & Watts; John Pivnichny

(57) ABSTRACT

A method and system for automatically enabling an automated commercial fishing process is provided. The method includes enabling a commercial fishing software application associated with selecting a location for implementing a commercial fishing process. In response user data identifying a user and license data associated with a commercial fishing license belonging to the user are received. A control signal is transmitted to a vehicle. The control signal enables control of the vehicle such that the vehicle initiates motion and navigates in a specified direction towards a specified geographical area. Control hardware of the vehicle verifies a status of the commercial fishing license belonging to the user and it is determined if the commercial fishing license authorizes commercial fishing activities within the specified geographical area.

20 Claims, 5 Drawing Sheets

(56) References Cited

U.S. PATENT DOCUMENTS

2012/0069131 A1     3/2012   Abelow
2014/0208395 A1     7/2014   Tietjen et al.
2017/0253304 A1     9/2017   Jalaldeen et al.

OTHER PUBLICATIONS

Friedman, Mark J.; List of IBM Patents or Patent Applications Treated as Related; Oct. 27, 2017; 1 page.

* cited by examiner

AUTOMATED COMMERCIAL FISHING LOCATION DETERMINATION

This application is a continuation application claiming priority to Ser. No. 15/060,961 filed Mar. 4, 2016.

FIELD

The present invention relates generally to a method for determining a commercial fishing location and in particular to a method and associated system for determining vehicle authorizations with respect to enabling a commercial fishing process associated with a vehicle with respect to a specified commercial fishing location.

BACKGROUND

Determining an area for performing specified functions typically includes an inaccurate process with little flexibility. Associating permission for performing specified functions with respect to a specified location area may include a complicated process that may be time consuming and require a large amount of resources. Accordingly, there exists a need in the art to overcome at least some of the deficiencies and limitations described herein above.

SUMMARY

A first aspect of the invention provides an automated commercial fishing method comprising: enabling, by a processor of a control system in response to a command from a user, a commercial fishing software application associated with selecting a location for implementing a commercial fishing process; retrieving, by the processor in response to the enabling, user data identifying the user; receiving, by the processor from the user, license data associated with a commercial fishing license belonging to the user; transmitting, by the processor to a vehicle in response to a user command, a control signal enabling control of the vehicle such that the vehicle initiates motion and navigates in a specified direction towards a specified geographical area; verifying, by the processor via control hardware of the vehicle, a status of the commercial fishing license belonging to the user; and first determining, by the processor via the control hardware of the vehicle, if the commercial fishing license authorizes commercial fishing activities within the specified geographical area.

A second aspect of the invention provides a computer program product, comprising a computer readable hardware storage device storing a computer readable program code, the computer readable program code comprising an algorithm that when executed by a computer processor of a control system implements an automated commercial fishing method, the method comprising: enabling, by the processor in response to a command from a user, a commercial fishing software application associated with selecting a location for implementing a commercial fishing process; retrieving, by the processor in response to the enabling, user data identifying the user; receiving, by the processor from the user, license data associated with a commercial fishing license belonging to the user; transmitting, by the processor to a vehicle in response to a user command, a control signal enabling control of the vehicle such that the vehicle initiates motion and navigates in a specified direction towards a specified geographical area; verifying, by the processor via control hardware of the vehicle, a status of the commercial fishing license belonging to the user; and first determining, by the processor via the control hardware of the vehicle, if the commercial fishing license authorizes commercial fishing activities within the specified geographical area.

A third aspect of the invention provides a control system comprising a computer processor coupled to a computer-readable memory unit, the memory unit comprising instructions that when executed by the computer processor executes an automated commercial fishing method comprising: enabling, by the processor in response to a command from a user, a commercial fishing software application associated with selecting a location for implementing a commercial fishing process; retrieving, by the processor in response to the enabling, user data identifying the user; receiving, by the processor from the user, license data associated with a commercial fishing license belonging to the user; transmitting, by the processor to a vehicle in response to a user command, a control signal enabling control of the vehicle such that the vehicle initiates motion and navigates in a specified direction towards a specified geographical area; verifying, by the processor via control hardware of the vehicle, a status of the commercial fishing license belonging to the user; and first determining, by the processor via the control hardware of the vehicle, if the commercial fishing license authorizes commercial fishing activities within the specified geographical area.

The present invention advantageously provides a simple method and associated system capable of determining an area for performing specified functions.

DETAILED DESCRIPTION

Figure 1:
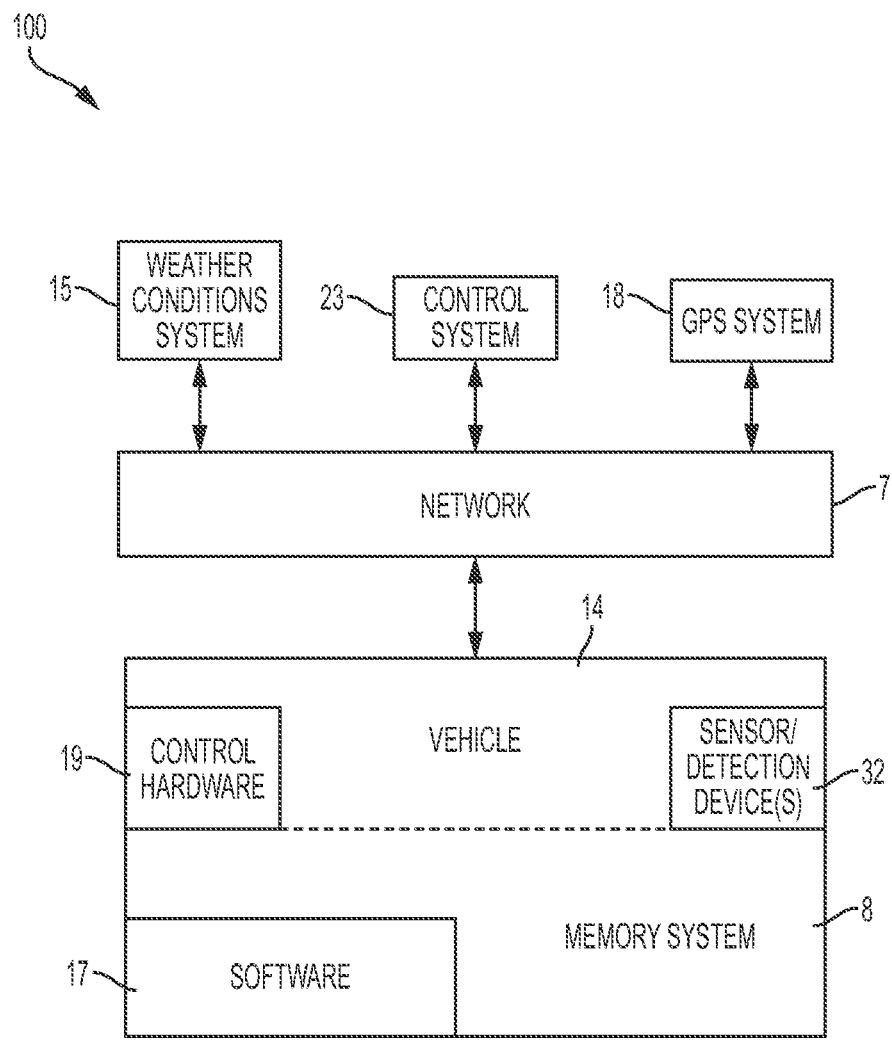
FIG. 1 illustrates a system for determining vehicle authorizations with respect to enabling a commercial fishing process associated with a vehicle with respect to a specified commercial fishing location, in accordance with embodiments of the present invention.

FIG. 1 illustrates a system 100 for determining vehicle authorizations with respect to enabling a commercial fishing process associated with a vehicle 14 with respect to a specified commercial fishing location, in accordance with embodiments of the present invention. System 100 enables a process for coordinating vehicle 14 with fish finder devices, GPS systems, and fishing equipment (e.g., a fishing net) deployment capability for executing a commercial fishing process thereby eliminating human intervention with respect to viewing a video stream with respect to determining an area for fishing net deployment. System 100 enables:
1. Verification of a specified geographical location associated commercial fishing permissions with respect to vehicle 14 (and an associated user).
2. Real-time analysis and detection of specified locations comprising a large volume of fish via sonar based on-board fish finders within vehicle 14.
3. Deployment of fishing equipment via vehicle 14 and notification of associated GPS coordinates of the deployed fishing equipment to the user.

Vehicle 14 may comprise any vehicle that does not require a human operator to be located within the vehicle 14 such as, inter alia, a remote controlled vehicle (e.g., an aircraft flown by a pilot at a ground control station), an autonomously controlled vehicle (e.g., an aircraft controlled based on pre-programmed flight plans and may include an intelligence algorithm that would enable vehicle 14 to know it's location and self-determine a location to perform commercial fishing dynamically), a pre-programmed vehicle, etc. Alternatively, vehicle 14 may comprise any type of vehicle that includes a human operator located within the vehicle (e.g., an aircraft, an automobile, a boat or ship, a train, etc.). Vehicle 14 may include, inter alia, an aerial vehicle, a land based vehicle, a marine (water) based vehicle, etc.

System 100 of FIG. 1 includes a weather conditions system 15, a control system 23, and a GPS system 18 connected through a network 7 to a vehicle 14. Vehicle 14 (i.e., control hardware 19 internal to vehicle), weather conditions system 15, control system 23, and GPS system 18 each may comprise an embedded computer. An embedded computer is defined herein as a dedicated computer comprising a combination of computer hardware and software (fixed in capability or programmable) specifically designed for executing a specialized function. Programmable embedded computers may comprise specialized programming interfaces. Additionally, vehicle 14 (i.e., control hardware 19 internal to vehicle), weather conditions system 15, control system 23, and GPS system 18 may each comprise a specialized hardware device comprising specialized (non-generic) hardware and circuitry (i.e., specialized discrete non-generic analog, digital, and logic based circuitry) for executing a process described with respect to FIGS. 1 and 2. The specialized discrete non-generic analog, digital, and logic based circuitry may include proprietary specially designed components (e.g., a specialized integrated circuit designed for only implementing an automated process for enabling a process for determining vehicle authorizations with respect to enabling a commercial fishing process associated with a vehicle 14 with respect to a specified commercial fishing location). Vehicle 14 includes a memory system 8, software 17, a sensor/detection device(s) 32, and control hardware 19 (all sensors and associated control hardware for enabling software 17 to execute a process for determining vehicle authorizations with respect to enabling a commercial fishing process). Sensors (within control hardware 19 and/or sensor/detection device(s) 32) may include, inter alia, GPS sensors, sonar based sensors, temperature sensors, pressure sensors, infrared sensors, motion sensors, video retrieval devices, etc.). The memory system 8 may include a single memory system. Alternatively, the memory system may include a plurality of memory systems. Network 7 may include any type of network including, inter alia, a local area network, (LAN), a wide area network (WAN), the Internet, a wireless network, etc. Vehicle 14 may retrieve/generate GPS coordinates based data (from GPS system 18) in response to commercial fishing process instructions.

Figure 2:
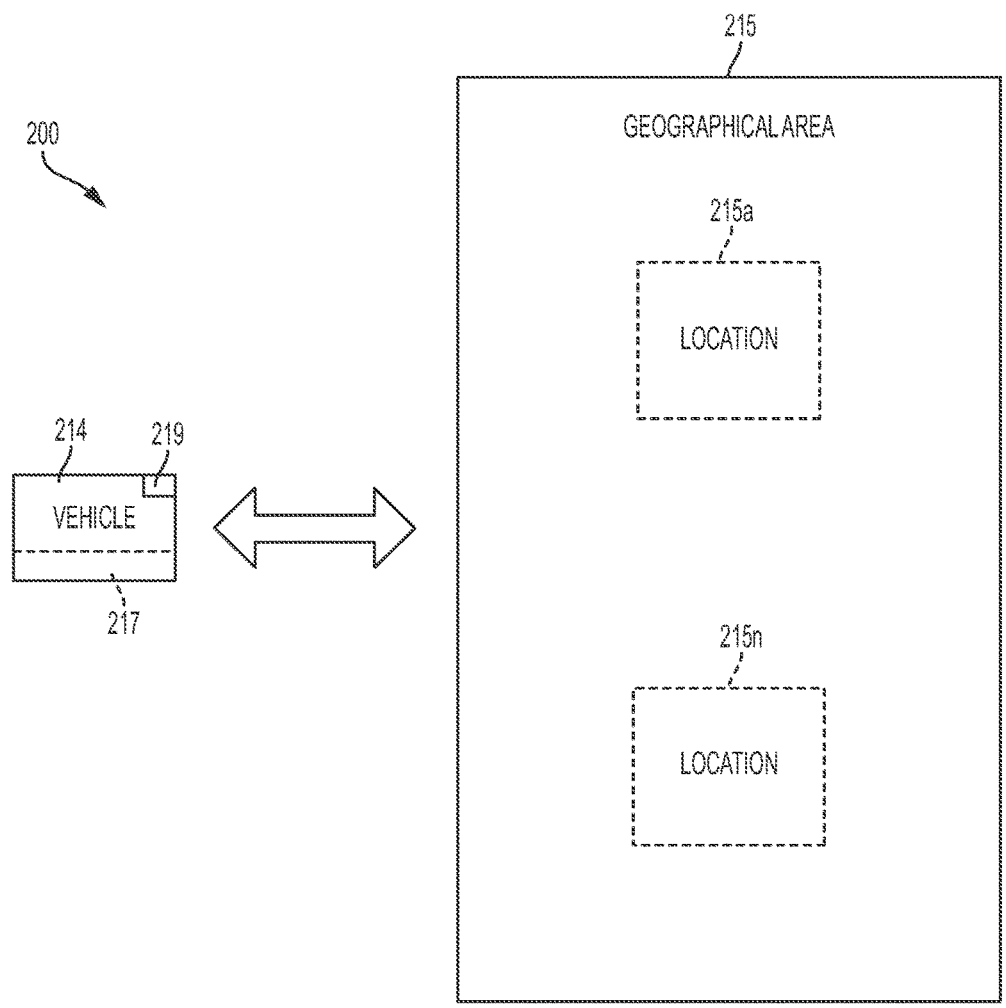
FIG. 2 illustrates a geographical area comprising various internal locations for executing a commercial fishing process with respect to a vehicle, in accordance with embodiments of the present invention.

FIG. 2 illustrates a geographical area 215 comprising various internal locations 215a . . . 215n for executing a commercial fishing process with respect to vehicle 214, in accordance with embodiments of the present invention. Vehicle 214 represents a detailed view of vehicle 14 (of FIG. 1). Vehicle 214 comprises sensor/detection device(s) 219 and is carrying fishing equipment 217 (e.g., a fishing net) for executing a commercial fishing process. Geographical area 215 comprises a water based geographical area (e.g., an ocean, a sea, a lake, etc.) comprising internal locations 215a . . . 215n targeted by vehicle 214 as being associated with commercial fishing permissions (with respect to vehicle 14 and an associated user of FIG. 1) and comprising a large volume of fish.

Figure 3:
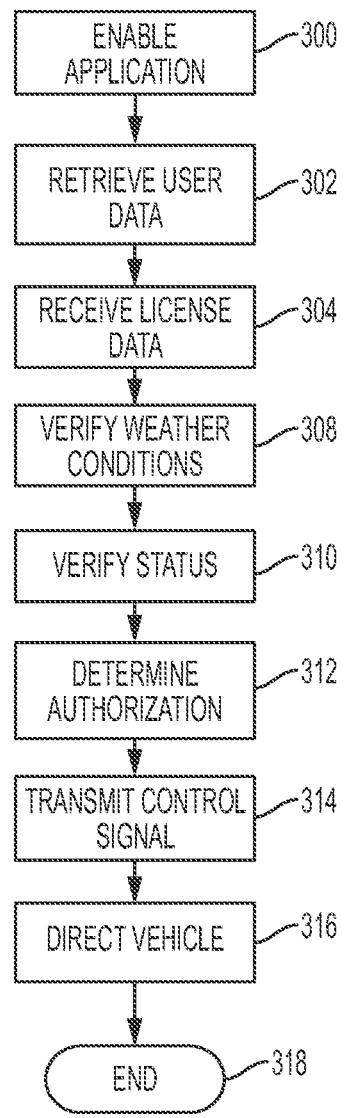
FIG. 3 illustrates an algorithm detailing a process flow enabled by the system of FIG. 1 for determining vehicle authorizations with respect to enabling a commercial fishing process associated with a vehicle with respect to a specified commercial fishing location, in accordance with embodiments of the present invention.

FIG. 3 illustrates an algorithm detailing a process flow enabled by system 100 of FIG. 1 for determining vehicle authorizations with respect to enabling a commercial fishing process associated with a vehicle with respect to a specified commercial fishing location, in accordance with embodiments of the present invention. Each of the steps in the algorithm of FIG. 3 may be enabled and executed in any order by a computer processor(s) or any type of specialized hardware executing computer code. In step 300, a commercial fishing software application is enabled by a control system in response to a command from a user. The commercial fishing software application is associated with selecting a location for implementing an automated commercial fishing process. In step 302, user data identifying the user is retrieved. In step 304, license data associated with a commercial fishing license belonging to the user is retrieved. In step 308, the control system verifies weather conditions associated with navigating the vehicle towards the specified geographical area. Additionally, a volume of fish within the specified geographical area may be monitored to determine if a specified volume of fish detected within the specified geographical area exceeds a specified threshold volume. In step 310, the control system verifies (via control hardware of the vehicle) a status of the commercial fishing license belonging to the user. In step 312, the control system determines (via the control hardware of the vehicle) if the commercial fishing license authorizes commercial fishing activities within the specified geographical area. In step 314, a control signal is transmitted to a vehicle in response to a user command. The control signal enables control of the vehicle such that the vehicle initiates motion and navigates in a specified direction towards a specified geographical area.

In step 316 (in response to results of steps 308, 310, 312, and 314), the vehicle is directed to the specified geographical area to deploy (from the vehicle) a fishing net apparatus in a water based location within the specified geographical area. Additionally, GPS coordinates of the water based location comprising the deployed net may be transmitted back to the control system for reference. The process is terminated in step 318.

Figure 4:
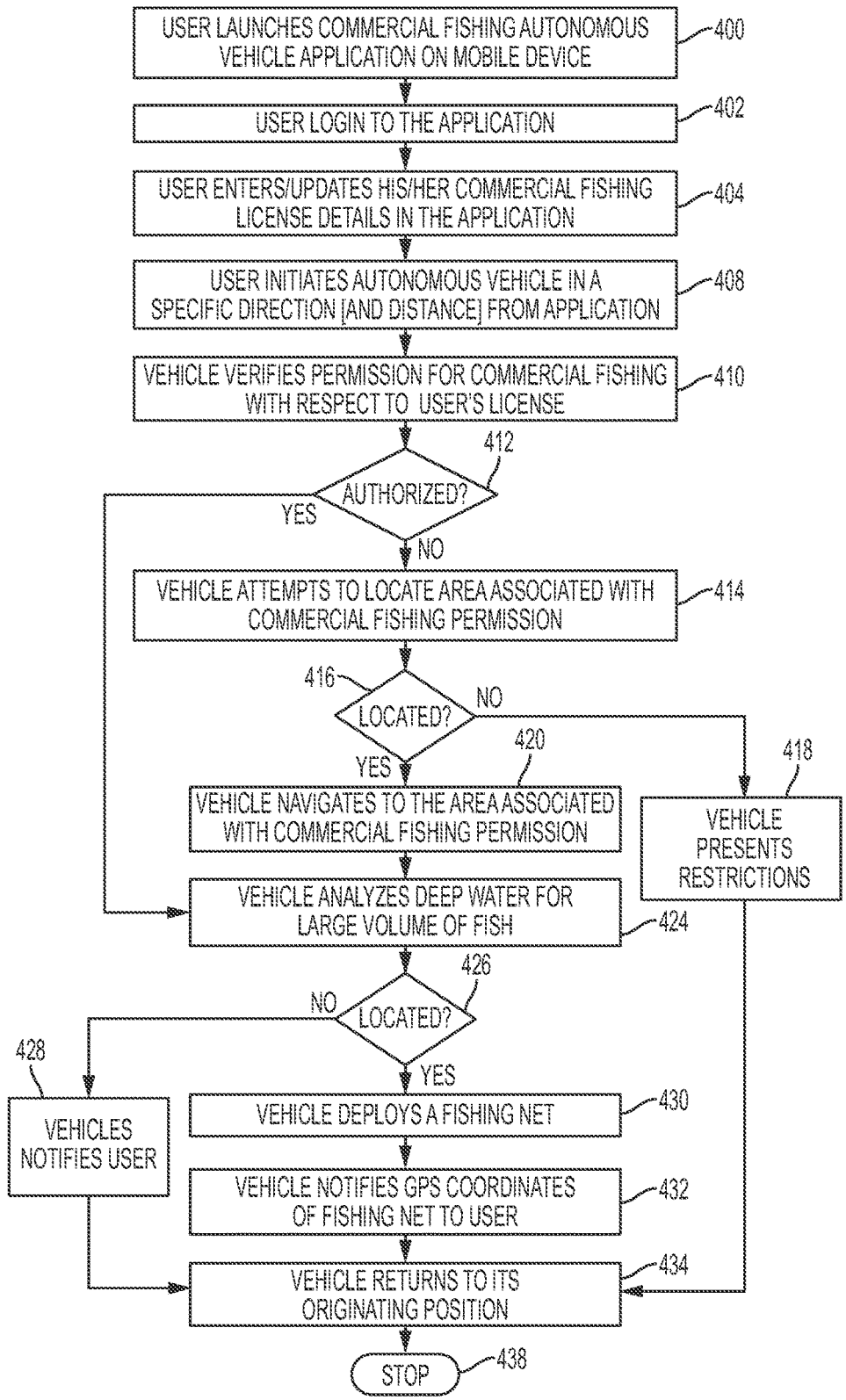
FIG. 4 illustrates an algorithm detailing an implementation example enabled by the system of FIG. 1 with respect to enabling a commercial fishing process associated with a vehicle with respect to a specified commercial fishing location, in accordance with embodiments of the present invention.

FIG. 4 illustrates an algorithm detailing an implementation example enabled by system 100 of FIG. 1 with respect to enabling a commercial fishing process associated with a (aerial) vehicle with respect to a specified commercial fishing location, in accordance with embodiments of the present invention. Each of the steps in the algorithm of FIG. 4 may be enabled and executed in any order by a computer processor(s) or any type of specialized hardware executing computer code. In step 400, a user launches a commercial fishing autonomous vehicle software application on a mobile device (e.g., cellular phone, tablet computer, laptop computer, etc.). In step 402, the user enters their credentials to login to the software application. If the user the user has not registered with the software application, the user executes a registration process and performs the aforementioned login process. In step 404, the user enters or updates his/her commercial fishing license details in the software application. In step 408, the user selects one or more autonomous vehicles configured to be enabled via the software application. Additionally, the user specifies a direction and distance for navigation thereby enabling (launching) the vehicle(s). The vehicle(s) may comprise autonomously controlled and may can be launched from, inter alia, a beach, a boat, a ship, etc. In step 410, the vehicle (via control hardware of the vehicle) verifies the user's license with respect to permission for commercial fishing. The vehicle(s) verifies (immediately following step 404) a status (e.g., active or expired) of commercial fishing license of the user. Additionally, the vehicle(s) verifies (immediately following verifying and confirming the user's license) weather conditions associated with potential challenges for flight. In response, the vehicle(s) navigates in the direction and distance specified by the user. The user's license verified (via GPS coordinates) with respect to commercial fishing permissions in specified waterways. In step 412, it is determined (based on results of step 410) if the users license authorizes commercial fishing permissions within a first specified waterway. If in step 412, it is determined that the users license authorizes commercial fishing permissions within the first specified waterway then step 424 is executed to analyze the first specified waterway for the presence of a specified (large) volume of fish located within deep water of the first specified waterway. If in step 412, it is determined that the users license does not authorize commercial fishing permissions within the first specified waterway then in step 414, the vehicle(s) requests an alternate commercial fishing location located within a predefined distance from its current GPS coordinates. In step 416, it is determined if an alternate commercial fishing location (requested in step 414) has been located. If in step 416, it is determined that an alternate commercial fishing location has not been located then in step 418, the vehicle(s) presents (to the user) restrictions associated with commercial fishing in the first specified waterway and in step 434, the vehicle is instructed to return to an originating location.

If in step 416, it is determined that an alternate commercial fishing location has been located then in step 420, the vehicle(s) is directed to and proceeds to navigate to the alternate commercial fishing location. In step 424, the alternate commercial fishing location is analyzed for the presence of a specified (large) volume of fish located within deep water of the alternate commercial fishing location. In step 426, it is determined (e.g., via on-board sonar based fish finding components) if the presence of a specified (large) volume of fish located within deep water of the alternate commercial fishing location (or the first specified waterway) has been detected. If in step 426, it is determined that the presence of a specified (large) volume of fish located within deep water of the alternate commercial fishing location (or the first specified waterway) has not been detected then in step 428, the vehicle(s) notifies the user that a large volume of fish is not present and in step 434, the vehicle is instructed to return to an originating location. If in step 426, it is determined that the presence of a specified (large) volume of fish located within deep water of the alternate commercial fishing location (or the first specified waterway) has been detected then in step 430, a fishing net (or alternative fishing equipment) is deployed (by the vehicle(s)). The fishing net may be secured by the vehicle(s) in a compressed mode during flight and may be expanded at a selected fishing location via light-weight mechanical (robotic) arms for deployment. The fishing nets may include floatation elements to prevent the net from completely sinking in the water. In step 432, GPS coordinates describing a location for the deployed net are transmitted to the user (for later retrieval of the net) and in step 434, the vehicle is instructed to return to an originating location. The process is terminated in step 438.

Figure 5:
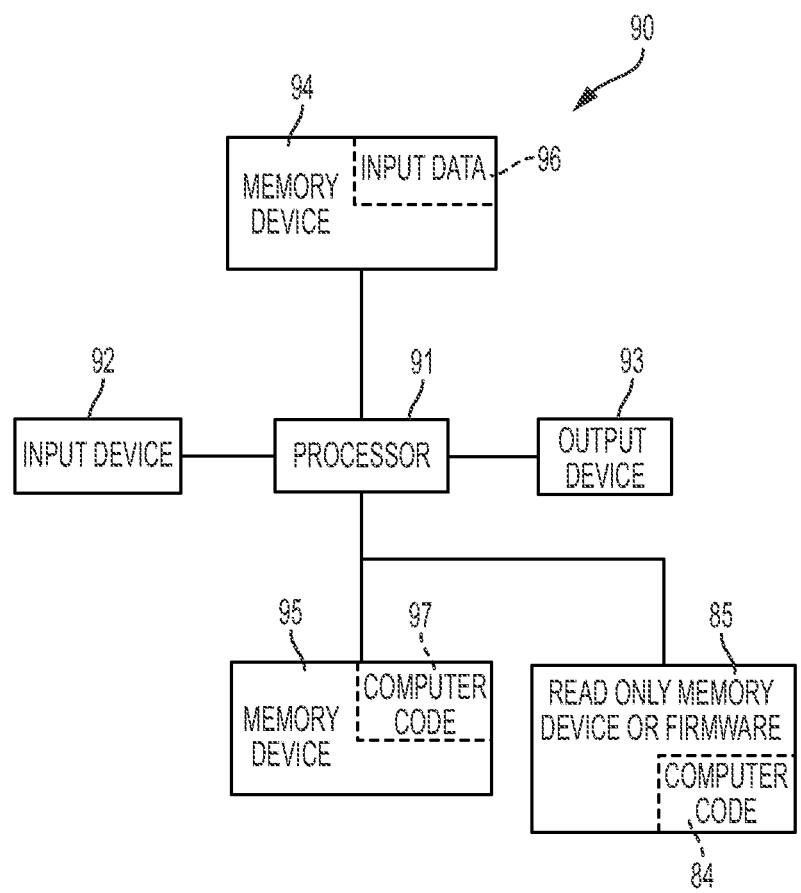
FIG. 5 illustrates a computer system used by the system of FIG. 1 for enabling a process for determining vehicle authorizations with respect to enabling a commercial fishing process associated with a vehicle with respect to a specified commercial fishing location, in accordance with embodiments of the present invention.

FIG. 5 illustrates a computer system 90 (e.g., control hardware, weather conditions system 15, control system 23, and GPS system 18) used by or comprised by the systems of FIG. 1 and FIG. 2 for enabling a process for determining vehicle authorizations with respect to enabling a commercial fishing process associated with a vehicle with respect to a specified commercial fishing location, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 5 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms for enabling a process for determining vehicle authorizations with respect to enabling a commercial fishing process associated with a vehicle with respect to a specified commercial fishing location. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithm) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to determine vehicle authorizations with respect to enabling a commercial fishing process associated with a vehicle with respect to a specified commercial fishing location. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for determining vehicle authorizations with respect to enabling a commercial fishing process associated with a vehicle with respect to a specified commercial fishing location. In another embodiment, the invention provides a business method that performs the process steps of the invention on a subscription, advertising, and/or fee basis. That is, a service supplier, such as a Solution Integrator, could offer to enable a process for determining vehicle authorizations with respect to enabling a commercial fishing process associated with a vehicle with respect to a specified commercial fishing location. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated commercial fishing method comprising:
    receiving, by a processor of a control system from a user, license data associated with a commercial fishing license belonging to said user;
    transmitting, by said processor to a vehicle in response to a user command, a control signal enabling control of said vehicle such that said vehicle initiates motion and navigates in a specified direction towards a specified geographical area;
    verifying, by said processor via control hardware of said vehicle, a status of said commercial fishing license belonging to said user;
    first determining, by said processor via said control hardware of said vehicle, if said commercial fishing license authorizes commercial fishing activities within said specified geographical area, wherein results of said first determining indicate that said commercial fishing license authorizes commercial fishing activities within said specified geographical area;
    monitoring, by said processor via said control hardware of said vehicle, a volume of fish within said specified geographical area; and
    second determining, by said computer processor based on analysis of results of said monitoring, if a specified volume of fish detected within said specified geographical area exceeds a specified threshold volume.

2. The method of claim 1, further comprising:
    verifying, by said computer processor, weather conditions associated with navigating said vehicle towards said specified geographical area.

3. The method of claim 1, wherein results of said second determining indicate that said specified volume of fish detected within said specified geographical area does not exceed said specified threshold volume, and wherein said method further comprises:
    generating, by said processor, a notification indicating that said specified volume of fish detected within said specified geographical area does not exceed said specified threshold volume;
    presenting, by said processor to said user, said notification; and
    directing, by said processor in response to said notification, said vehicle to an original geographical position.

4. The method of claim 1, wherein results of said second determining indicate that said specified volume of fish detected within said specified geographical area exceeds said specified threshold volume, and wherein said method further comprises:
    deploying from said vehicle, by said processor via said control hardware of said vehicle, a fishing net apparatus in a water based location within said specified geographical area;
    retrieving, by said processor from said control hardware of said vehicle, global positioning satellite (GPS) coordinates of said fishing net apparatus;
    presenting, by said processor to said user, said GPS coordinates; and
    directing, by said processor in response to said notification, said vehicle to an original geographical position.

5. The method of claim 1, wherein results of said first determining indicate that said commercial fishing license does not authorize commercial fishing activities within said specified geographical area, and wherein said method further comprises:
    directing, by said processor in response to said results of said first determining, said vehicle to an alternate geographical area associated with commercial fishing activities authorized by said commercial fishing license;
    monitoring, by said processor via said control hardware of said vehicle, a volume of fish within said alternate geographical area; and
    second determining, by said computer processor based on analysis of results of said monitoring, if a specified volume of fish detected within said alternate geographical area exceeds a specified threshold volume.

6. The method of claim 5, wherein said alternate geographical area is located within a predefined distance from a current position of said vehicle.

7. The method of claim 5, wherein results of said second determining indicate that said specified volume of fish detected within said alternate geographical area does not exceed said specified threshold volume, and wherein said method further comprises:
    generating, by said processor, a notification indicating that said specified volume of fish detected within said alternate geographical area does not exceed said specified threshold volume;
    presenting, by said processor to said user, said notification; and
    directing, by said processor in response to said notification, said vehicle to an original geographical position.

8. The method of claim 5, wherein results of said second determining indicate that said specified volume of fish detected within said alternate geographical area exceeds said specified threshold volume, and wherein said method further comprises:

deploying from said vehicle, by said processor via said control hardware of said vehicle, a fishing net apparatus in a water based location within said alternate geographical area;

retrieving, by said processor from said control hardware of said vehicle, global positioning satellite (GPS) coordinates of said water based location;

presenting, by said processor to said user, said GPS coordinates; and directing, by said processor in response to said notification, said vehicle to an original geographical position.

9. The method of claim 1, further comprising:

providing at least one support service for at least one of creating, integrating, hosting, maintaining, and deploying computer-readable code in the control hardware, said code being executed by the computer processor to implement: said receiving, said transmitting, said verifying, and said first determining.

10. A computer program product, comprising a computer readable hardware storage device storing a computer readable program code, said computer readable program code comprising an algorithm that when executed by a computer processor of a control system implements an automated commercial fishing method, said method comprising:

receiving, by said processor, license data associated with a commercial fishing license belonging to a user;

transmitting, by said processor to a vehicle in response to a user command, a control signal enabling control of said vehicle such that said vehicle initiates motion and navigates in a specified direction towards a specified geographical area;

verifying, by said processor via control hardware of said vehicle, a status of said commercial fishing license belonging to said user;

first determining, by said processor via said control hardware of said vehicle, if said commercial fishing license authorizes commercial fishing activities within said specified geographical area, wherein results of said first determining indicate that said commercial fishing license authorizes commercial fishing activities within said specified geographical area;

monitoring, by said processor via said control hardware of said vehicle, a volume of fish within said specified geographical area; and second determining, by said computer processor based on analysis of results of said monitoring, if a specified volume of fish detected within said specified geographical area exceeds a specified threshold volume.

11. The computer program product of claim 10, wherein said method further comprises: verifying, by said computer processor, weather conditions associated with navigating said vehicle towards said specified geographical area.

12. The computer program product of claim 10, wherein results of said second determining indicate that said specified volume of fish detected within said specified geographical area does not exceed said specified threshold volume, and wherein said method further comprises:

generating, by said processor, a notification indicating that said specified volume of fish detected within said specified geographical area does not exceed said specified threshold volume;

presenting, by said processor to said user, said notification; and directing, by said processor in response to said notification, said vehicle to an original geographical position.

13. The computer program product of claim 10, wherein results of said second determining indicate that said specified volume of fish detected within said specified geographical area exceeds said specified threshold volume, and wherein said method further comprises:

deploying from said vehicle, by said processor via said control hardware of said vehicle, a fishing net apparatus in a water based location within said specified geographical area;

retrieving, by said processor from said control hardware of said vehicle, global positioning satellite (GPS) coordinates of said fishing net apparatus;

presenting, by said processor to said user, said GPS coordinates; and directing, by said processor in response to said notification, said vehicle to an original geographical position.

14. The computer program product of claim 10, wherein results of said first determining indicate that said commercial fishing license does not authorize commercial fishing activities within said specified geographical area, and wherein said method further comprises:

directing, by said processor in response to said results of said first determining, said vehicle to an alternate geographical area associated with commercial fishing activities authorized by said commercial fishing license;

monitoring, by said processor via said control hardware of said vehicle, a volume of fish within said alternate geographical area; and second determining, by said computer processor based on analysis of results of said monitoring, if a specified volume of fish detected within said alternate geographical area exceeds a specified threshold volume.

15. The computer program product of claim 14, wherein said alternate geographical area is located within a predefined distance from a current position of said vehicle.

16. The computer program product of claim 14, wherein results of said second determining indicate that said specified volume of fish detected within said alternate geographical area does not exceed said specified threshold volume, and wherein said method further comprises:

generating, by said processor, a notification indicating that said specified volume of fish detected within said alternate geographical area does not exceed said specified threshold volume;

presenting, by said processor to said user, said notification; and directing, by said processor in response to said notification, said vehicle to an original geographical position.

17. The computer program product of claim 14, wherein results of said second determining indicate that said specified volume of fish detected within said alternate geographical area exceeds said specified threshold volume, and wherein said method further comprises:

deploying from said vehicle, by said processor via said control hardware of said vehicle, a fishing net apparatus in a water based location within said alternate geographical area;

retrieving, by said processor from said control hardware of said vehicle, global positioning satellite (GPS) coordinates of said water based location;

presenting, by said processor to said user, said GPS coordinates; and directing, by said processor in response to said notification, said vehicle to an original geographical position.

18. A control system comprising a computer processor coupled to a computer-readable memory unit, said memory unit comprising instructions that when executed by the computer processor executes an automated commercial fishing method comprising:
  receiving, by said processor, license data associated with a commercial fishing license belonging to a user;
  transmitting, by said processor to a vehicle in response to a user command, a control signal enabling control of said vehicle such that said vehicle initiates motion and navigates in a specified direction towards a specified geographical area;
  verifying, by said processor via control hardware of said vehicle, a status of said commercial fishing license belonging to said user;
  first determining, by said processor via said control hardware of said vehicle, if said commercial fishing license authorizes commercial fishing activities within said specified geographical area, wherein results of said first determining indicate that said commercial fishing license authorizes commercial fishing activities within said specified geographical area;
  monitoring, by said processor via said control hardware of said vehicle, a volume of fish within said specified geographical area; and
  second determining, by said computer processor based on analysis of results of said monitoring, if a specified volume of fish detected within said specified geographical area exceeds a specified threshold volume.

19. The control system of claim 18, wherein said method further comprises:
  verifying, by said computer processor, weather conditions associated with navigating said vehicle towards said specified geographical area.

20. The control system of claim 18, wherein results of said second determining indicate that said specified volume of fish detected within said specified geographical area does not exceed said specified threshold volume, and wherein said method further comprises:
  generating, by said processor, a notification indicating that said specified volume of fish detected within said specified geographical area does not exceed said specified threshold volume;
  presenting, by said processor to said user, said notification; and
  directing, by said processor in response to said notification, said vehicle to an original geographical position.

* * * * *